United States Patent
Makino et al.

(10) Patent No.: US 9,542,519 B2
(45) Date of Patent: Jan. 10, 2017

(54) METHOD AND DESIGN APPARATUS

(71) Applicant: SOCIONEXT INC., Yokohama-shi, Kanagawa (JP)

(72) Inventors: Ryo Makino, Akiruno (JP); Atsushi Tsuchiya, Akiruno (JP)

(73) Assignee: Socionext Inc., Yokohama (JP)

( * ) Notice: Subject to any disclaimer, the term of this patent is extended or adjusted under 35 U.S.C. 154(b) by 0 days.

(21) Appl. No.: 14/934,041

(22) Filed: Nov. 5, 2015

(65) Prior Publication Data
US 2016/0154904 A1 Jun. 2, 2016

(30) Foreign Application Priority Data
Dec. 1, 2014 (JP) .................................. 2014-243353

(51) Int. Cl.
*G06F 17/50* (2006.01)

(52) U.S. Cl.
CPC ......... *G06F 17/505* (2013.01); *G06F 17/5031* (2013.01); *G06F 17/5072* (2013.01); *G06F 2217/84* (2013.01)

(58) Field of Classification Search
CPC ............... G06F 17/505; G06F 17/5031; G06F 17/5045; G06F 17/5059; G06F 17/5072; G06F 2217/84
USPC .......................... 716/101, 104, 108, 113, 134
See application file for complete search history.

(56) References Cited

U.S. PATENT DOCUMENTS

| 7,543,265 B1 * | 6/2009 | Baeckler | G06F 17/5054 716/104 |
| 8,296,696 B1 * | 10/2012 | Chiu | G06F 17/5054 716/104 |
| 2007/0234244 A1 * | 10/2007 | Kitai | G06F 17/504 716/104 |

FOREIGN PATENT DOCUMENTS

| JP | 06-019999 A | 1/1994 |
| JP | 11-145297 A | 5/1999 |
| JP | 2003-076729 A | 3/2003 |

* cited by examiner

Primary Examiner — Paul Dinh
(74) Attorney, Agent, or Firm — Arent Fox LLP

(57) ABSTRACT

A computer sets a first timing condition for plural registers included in first design information of a semiconductor integrated circuit, and executes first logic synthesis to generate second design information. The computer sets, for the registers, a second timing condition having a smaller timing margin than the first timing condition, and executes second logic synthesis to generate third design information. The computer calculates an area change rate caused by a difference between the timing conditions, on the basis of the second and third design information with respect to each logic cone including a register at its end point, and categorizes the registers into a first group and a second group having smaller change rates than the first group, according to the change rate. The computer executes third logic synthesis with the second timing condition set for the first group and the first timing condition set for the second group.

6 Claims, 18 Drawing Sheets

FIG. 4

| DELAY VARIATION ELEMENT | DELAY VARIATION VALUE | |
|---|---|---|
| | AUTOMATIC LAYOUT | MANUAL LAYOUT |
| CLOCK SKEW | 250ps | 50ps |
| CROSSTALK DELAY | 250ps | 50ps |
| CLOCK OCV | 200ps | 50ps |
| WIRING DELAY GAP | 150ps | 150ps |
| PLL JITTER | 100ps | 100ps |

SUM = 950ps 400ps

TIMING CONDITION: MAXIMUM MARGIN / MINIMUM MARGIN

| REGISTER NAME | LOGIC CONE AREA | |
| --- | --- | --- |
| | Tmin | Tmax |
| FF_incr0p[28] | 116 | 129 |
| FF_incr6p[8] | 131935 | 141004 |
| FF_incr0p[30] | 116 | 129 |
| ... | ... | ... |
| FF_incr0p[31] | 5613 | 5627 |
| FF_incr6p[9] | 131935 | 141004 |
| FF_incr0p[29] | 112 | 114 |

| REGISTER NAME | LOGIC CONE AREA | | AREA CHANGE RATE |
|---|---|---|---|
| | Tmin | Tmax | |
| FF_incr0p[28] | 116 | 129 | 0.01% |
| FF_incr6p[8] | 131935 | 141004 | 6.00% |
| FF_incr0p[30] | 116 | 129 | 0.01% |
| ... | ... | ... | ... |
| FF_incr0p[31] | 5613 | 5627 | 0.01% |
| FF_incr6p[9] | 131935 | 141004 | 6.00% |
| FF_incr0p[29] | 112 | 114 | 0.00% |

| REGISTER NAME | LOGIC CONE AREA | | AREA CHANGE RATE |
|---|---|---|---|
| | Tmin | Tmax | |
| FF_incr6p[10] | 131935 | 141004 | 6.00% |
| FF_incr6p[9] | 131935 | 141004 | 6.00% |
| FF_incr6p[8] | 131935 | 141004 | 6.00% |
| ... | ... | ... | ... |
| FF_incr0p[31] | 5613 | 5627 | 0.01% |
| FF_incr0p[30] | 116 | 129 | 0.01% |
| FF_incr0p[29] | 112 | 114 | 0.00% |

FIG. 15

REGISTERS OF TOP 10% (MARKED PART) ARE
MANUAL LAYOUT TARGET.

| REGISTER NAME | LOGIC CONE AREA | | AREA CHANGE RATE |
|---|---|---|---|
| | Tmin | Tmax | |
| FF_incr6p[10] | 131935 | 141004 | 6.00% |
| FF_incr6p[9] | 131935 | 141004 | 6.00% |
| FF_incr6p[8] | 131935 | 141004 | 6.00% |
| ... | ... | ... | ... |
| FF_incr0p[31] | 5613 | 5627 | 0.01% |
| FF_incr0p[30] | 116 | 129 | 0.01% |
| FF_incr0p[29] | 112 | 114 | 0.00% |

FIG. 18

| LOGIC SYNTHESIS CONDITION | AREA | INCREASE RATE |
|---|---|---|
| LOGIC SYNTHESIS AFTER SETTING TIMING CONDITION Tmin FOR ALL REGISTERS | 151337.9 | — |
| LOGIC SYNTHESIS AFTER SETTING TIMING CONDITION Tmin FOR REGISTERS OF TOP 10% AND TIMING CONDITION Tmax FOR REMAINING REGISTERS | 152804.7 | 0.97% |
| LOGIC SYNTHESIS AFTER SETTING TIMING CONDITION Tmax FOR ALL REGISTERS | 192309.4 | 27% |

METHOD AND DESIGN APPARATUS

CROSS-REFERENCE TO RELATED APPLICATION

This application is based upon and claims the benefit of priority of the prior Japanese Patent Application No. 2014-243353, filed on Dec. 1, 2014, the entire contents of which are incorporated herein by reference.

FIELD

The embodiments discussed herein relate to a design method and a design apparatus.

BACKGROUND

Designing of semiconductor integrated circuits involves logic synthesis to convert design information from register transfer level (RTL) to gate level (netlist). In the logic synthesis process, RTL design information, timing conditions, design rule check (DRC), etc. are used to decide which circuit to implement functions.

A timing condition that is given at the time of the logic synthesis indicates a design margin relevant to timing (hereinafter, referred to as timing margin). Variations in delay time of clock signals, due to clock skew, clock on chip variation (OCV), crosstalk delay, a gap between wiring delay estimate and real wiring delay, phase locked loop (PLL) jitter, and other reasons may not be considered at the time of logic synthesis. Hence, at the time of logic synthesis, a timing margin is set in the timing condition on the basis of the sum of the worst-case values of delay time variations generated in the above respective delay variation elements, such as clock skew.

See, for example, Japanese Laid-open Patent Publication Nos. 2003-76729, 11-145297, and 6-19999.

In the meantime, when a timing margin is set as described above, a timing constraint to be satisfied becomes severe, and a logic synthesis tool generates a netlist by selecting comparatively high-speed circuits, so as to satisfy the constraint. Such a circuit tends to have a large circuit area. Hence, a problem is to reduce a circuit area of a semiconductor integrated circuit.

SUMMARY

According to one aspect, there is provided a design method including: generating, by a processor, second design information by setting a first timing condition for a plurality of registers included in first design information of a semiconductor integrated circuit and performing first logic synthesis; generating, by the processor, third design information by setting a second timing condition for the plurality of registers and performing second logic synthesis, wherein the second timing condition has a smaller timing margin than the first timing condition; calculating, by the processor, an area change rate, due to a difference between the timing conditions, of each of a plurality of logic cones each including one of the plurality of registers at an end point, on the basis of the second design information and the third design information; categorizing, by the processor, the plurality of registers into a first group and a second group on the basis of magnitudes of the calculated area change rates, wherein the area change rates of the second group are smaller than the area change rates of the first group; and executing, by the processor, third logic synthesis with the second timing condition being set for first registers of the first group and the first timing condition being set for second registers of the second group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of timing conditions;

FIG. 9 illustrates an example of an area comparing table;

FIG. 10 illustrates an example of an area comparing table to which area change rates are incorporated;

FIG. 12 illustrates an example of an area comparing table after sort;

FIG. 15 illustrates an exemplary display of an area comparing table;

FIG. 18 illustrates an example of area reduction effect of a semiconductor integrated circuit, which is obtained by the design method of the present embodiment.

DESCRIPTION OF EMBODIMENTS

Figure 1:
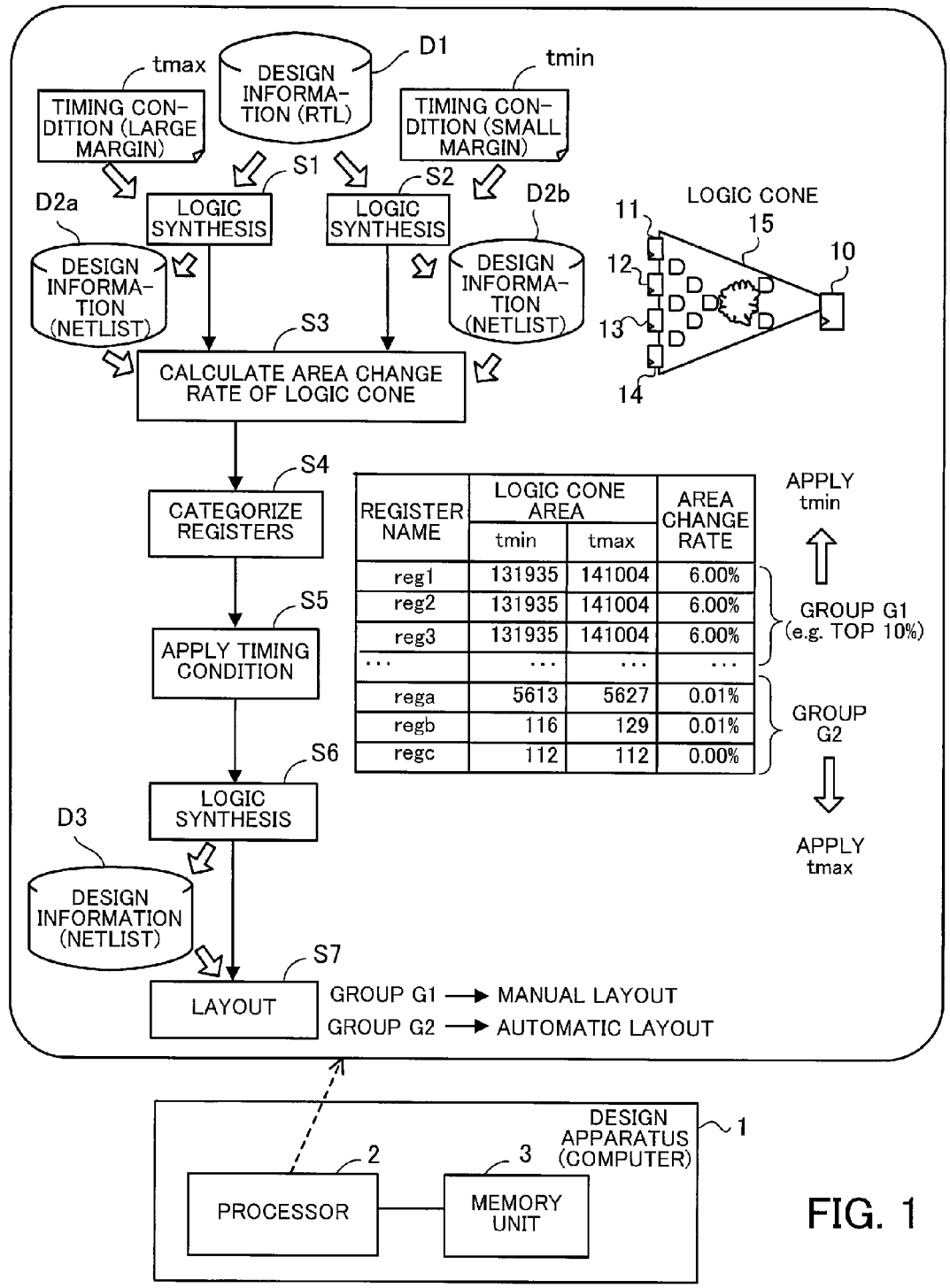
FIG. 1 illustrates an example of a design method of a first embodiment.

Several embodiments will be described below with reference to the accompanying drawings, wherein like reference numerals refer to like elements throughout.

First Embodiment

In the design method of the present embodiment, a semiconductor integrated circuit is designed by a computer. FIG. 1 illustrates an example of the design method of the first embodiment. The design method is performed by a design apparatus 1 which is described below.

The design apparatus 1 is a computer that includes a processor 2 and a memory unit 3, for example. The processor 2 executes the following process on the basis of data and programs stored in the memory unit 3.

The memory unit 3 stores programs executed by the processor 2 and various types of data. For example, the memory unit 3 stores design information D1, D2a, D2b, and D3, for example. The design information D1 includes RTL design information of a semiconductor integrated circuit. The design information D2a, D2b, and D3 are netlists generated by logic synthesis. Although not depicted in FIG. 1, the memory unit 3 stores a library that describes the function and the area of each cell.

In the design method of the first embodiment, the processor 2 first sets a timing condition tmax for a plurality of registers that are included in the design information D1, and executes logic synthesis to generate the design information D2a (step S1). Further, the processor 2 sets a timing condition tmin having a smaller timing margin than the timing condition tmax, for the registers that are included in the design information D1, and executes logic synthesis to generate the design information D2b (step S2). Note that one of step S1 and step S2 may be executed after the other, or alternatively both may be executed in parallel.

Note that the timing condition tmin is set for the registers by assuming a relatively small delay time variation due to delay variation elements. Hence, this timing condition tmin imposes a lax timing constraint. Also, as described later, the delay variation value can be reduced by manual layout, and thus the timing condition tmin is appropriate for manual layout.

On the other hand, the timing condition tmax is set for the registers by assuming a large delay time variation due to the delay variation elements (for example, in consideration of the worst case). Hence, this timing condition tmax imposes a severe timing constraint. Also, the timing condition tmax is appropriate for automatic layout.

The above timing conditions tmin and tmax are expressed as timing margin (time). The timing margin of the timing condition tmin is smaller than that of the timing condition tmax.

After step S2, the processor 2 calculates a change rate of an area due to the difference between the timing conditions (hereinafter, referred to as area change rate), with respect to each logic cone including a corresponding register at its end point, on the basis of the design information D2a and D2b, (step S3).

FIG. 1 illustrates a logic cone 15 formed by combinational circuits between a register 10 at an end point and a plurality of registers 11, 12, 13, and 14 at a prior stage.

The area of the logic cone 15 tends to become larger, as the timing margin set for the register 10 becomes larger (in other words, as the timing constraint to be satisfied is severer). Hence, the logic cone 15 tends to be larger, when the timing condition tmax is set for the register 10, than when the timing condition tmin is set for the register 10. However, the type of calculation performed by the circuit that includes the register 10 affects how much the area of the logic cone 15 changes due to the difference between the timing conditions.

In step S3, the processor 2 calculates, as an area change rate, how much the area of logic cone changes due to the difference between the timing conditions, with respect to each logic cone including a corresponding register at its end point. The area change rate is calculated by calculating a difference between the area of the logic cone obtained when the timing condition tmax is set and the area of the logic cone obtained when the timing condition tmin is set, and dividing the calculated difference by an area of the entire circuit after logic synthesis.

Note that the area of the logic cone is calculated by summing the areas of the cells in the logic cone (which are described in a library). Also, the area of the entire circuit is calculated by summing the areas of the cells.

FIG. 1 illustrates an example of logic cone areas under both timing conditions tmax and tmin as well as area change rates, with respect to respective registers with register names "reg1", "reg2", "reg3", . . . "rega", "regb", and "regc" which are at end points.

After step S3, the processor 2 divides a plurality of registers into two groups on the basis of the magnitudes of the area change rates (step 4). In the example of FIG. 1, the registers with register names "reg1", "reg2", and "reg3" are classified into a group G1. Then, the registers with register names "rega", "regb", and "regc" are classified into a group G2. Here, the area change rates of the registers with register names "rega", "regb", and "regc" are smaller than the area change rates of the registers with register names "reg1", "reg2", and "reg3".

In step S4, the processor 2 puts fewer registers into the group G1 than into the group G2. For example, registers in the largest (top) 10% of area change rates may be put into the group G1. Its reason will be described later.

Note that, in step S4, the processor 2 may display the area change rates of the registers illustrated in FIG. 1 on a display (not depicted), and accept, from a user, an input of information such as the number of registers that are classified into the group G1, in order to categorize the registers on the basis of the input information.

After step S4, the processor 2 applies timing conditions for the registers (step S5) and executes logic synthesis to generate the design information D3 (netlist) (step S6).

In step S5, the processor 2 sets the timing condition tmin for the registers of the group G1 and the timing condition tmax for the registers of the group G2, as illustrated in FIG. 1, for example. Thus, the timing condition tmin is set for the registers at the end points of the logic cones whose area change rates are large. Also, the timing condition tmax is set for the registers at the end points of the logic cones whose area change rates are small.

As described above, the circuit area after logic synthesis is reduced efficiently by setting the timing condition tmin for the register group whose logic cones would occupy a larger area under the timing condition tmax (in other words, the register group whose area change rates are large).

After step S6, the processor 2 performs layout on the basis of the design information D3 (step S7). In step S7, the processor 2 performs automatic layout for the logic cones having respective registers classified into the group G2 at the end points, among the registers that have been classified into the two groups G1 and G2 in step S4.

On the other hand, manual layout is performed by a user for the logic cones having the respective registers classified into the group G1 at the end points. For the purpose of satisfying the timing condition tmin which has a comparatively small timing margin and is set for the registers classified into the group G1, manual layout is more appropriate because of its capability of reducing the delay variation value due to the aforementioned delay variation elements, as compared with the automatic layout. However, in order to prevent an increase of the work amount for manual layout, the number of registers classified into the group G1 is set smaller than the number of registers classified into the group G2, as described above.

According to the above design method, the processor 2 identifies logic cones that exhibit large changes in area between different timing conditions used in logic synthesis, and sets a timing condition of a small timing margin for the registers at the end points of the identified logic cones.

Hence, the areas of the logic cones after the logic synthesis are reduced efficiently, and as a result the circuit area of the semiconductor integrated circuit is reduced.

Also, an increase of the work amount for manual layout is prevented by setting the number of registers in such a manner that the number of registers for which the timing condition tmin is set for manual layout is smaller than the number of registers for which the timing condition tmax is set for automatic layout.

Second Embodiment

Figure 2:
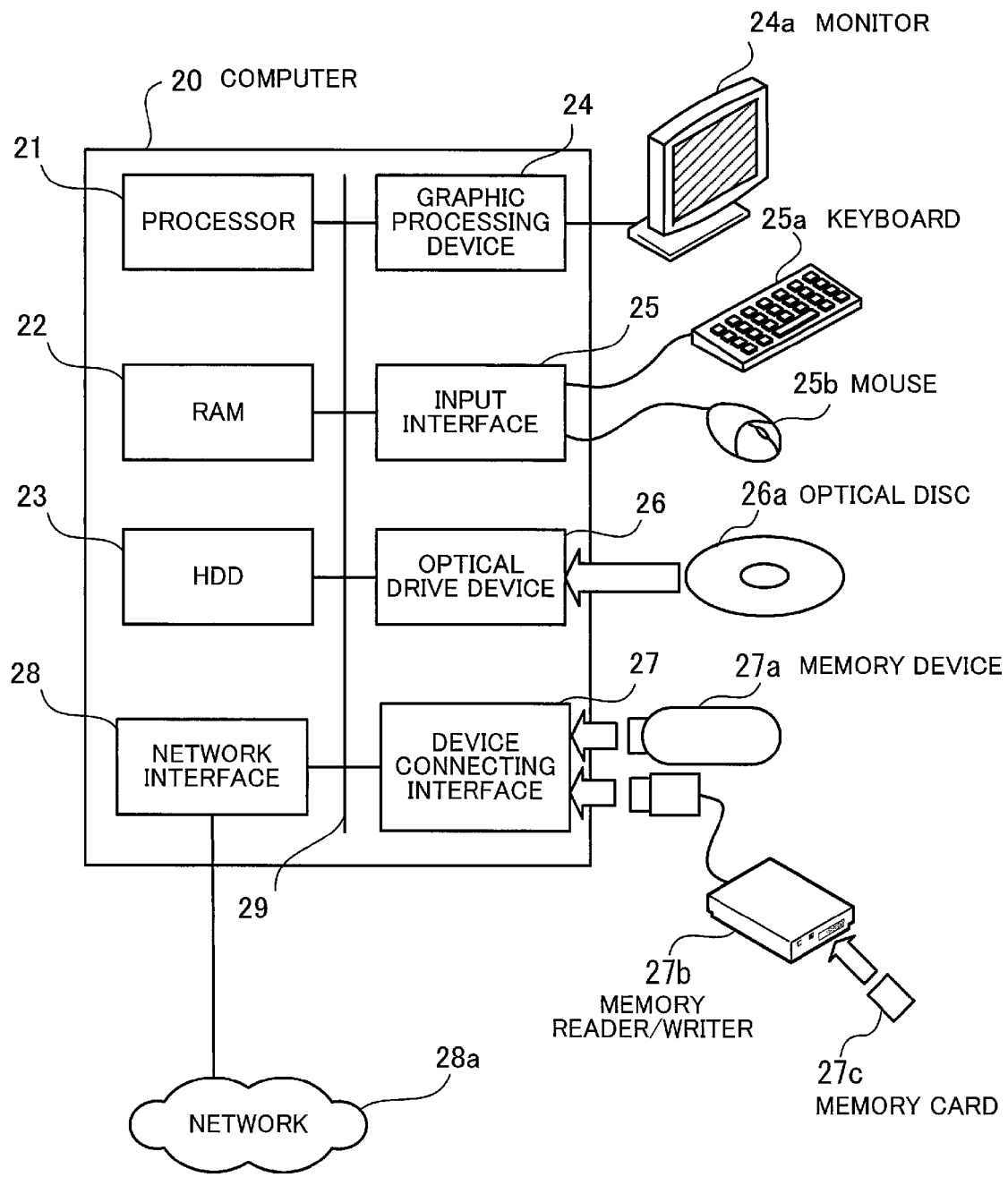
FIG. 2 illustrates an example of a design apparatus of a second embodiment.

In the following, an example of the design method and the design apparatus of the second embodiment is illustrated. FIG. 2 illustrates an example of the design apparatus of the second embodiment.

The design apparatus is a computer 20 for example, and the entire apparatus is controlled by a processor 21. A random access memory (RAM) 22 and a plurality of peripheral devices are connected to the processor 21 via a bus 29. The processor 21 may be a multiprocessor. The processor 21 is a central processing unit (CPU), a micro processing unit (MPU), a digital signal processor (DSP), an application specific integrated circuit (ASIC), or a programmable logic device (PLD), for example. Also, the processor 21 may be a combination of two or more elements of a CPU, an MPU, a DSP, an ASIC, and a PLD.

The RAM 22 is used as a main memory device of the computer 20. At least a part of operating system (OS) programs and application programs executed by the processor 21 is temporarily stored in the RAM 22. Also, various types of data for processing by the processor 21 is stored in the RAM 22.

The peripheral devices connected to the bus 29 include a hard disk drive (HDD) 23, a graphic processing device 24, an input interface 25, an optical drive device 26, a device connecting interface 27, and a network interface 28.

The HDD 23 writes data into and reads data from a built-in disk magnetically. The HDD 23 is used as an auxiliary memory device of the computer 20. The OS programs, the application programs, and various types of data are stored in the HDD 23. Note that the auxiliary memory device may be a semiconductor memory device, such as a flash memory.

A monitor 24a is connected to the graphic processing device 24. The graphic processing device 24 displays an image on the screen of the monitor 24a in accordance with a command from the processor 21. The monitor 24a is a liquid crystal display device or a display device using a cathode ray tube (CRT), for example.

A keyboard 25a and a mouse 25b are connected to the input interface 25. The input interface 25 receives a signal from the keyboard 25a and the mouse 25b and supplies it to the processor 21. Note that the mouse 25b is an example of a pointing device, and other pointing devices may be used. Other pointing devices are, for example, a touch panel, a tablet, a touch pad, and a trackball.

The optical drive device 26 reads data stored in an optical disc 26a, utilizing laser light or the like. The optical disc 26a is a portable storage medium in which data is stored in a readable manner by reflection of light. The optical disc 26a is, for example, a digital versatile disc (DVD), a DVD-RAM, a compact disc read only memory (CD-ROM), and a CD-R (Recordable)/RW (ReWritable).

The device connecting interface 27 is a communication interface for connecting the peripheral devices to the computer 20. For example, a memory device 27a and a memory reader/writer 27b may be connected to the device connecting interface 27. The memory device 27a is a storage medium having a function for communicating with the device connecting interface 27. The memory reader/writer 27b is a device for writing data into or reading data from a memory card 27c. The memory card 27c is a storage medium of a card type.

The network interface 28 is connected to a network 28a. The network interface 28 transmits data to and receives data from another computer or communication device via the network 28a.

The processing function of the second embodiment is implemented by the above hardware configuration. Note that the design apparatus 1 of the first embodiment illustrated in FIG. 1 is configured with the same hardware as the computer 20 illustrated in FIG. 2.

The computer 20 provides the processing function of the second embodiment by executing a program stored in a computer-readable storage medium, for example. A program describing a procedure executed in the computer 20 may be stored in various storage media. For example, a program executed by the computer 20 may be stored in the HDD 23. The processor 21 loads at least a part of the program from the HDD 23 into the RAM 22 and executes the program. Also, the program executed by the computer 20 may be stored in a portable storage medium, such as the optical disc 26a, the memory device 27a, and the memory card 27c. The program stored in such a portable storage medium becomes executable after installed in the HDD 23 by the control from the processor 21, for example. Also, the processor 21 may read the program directly from the portable storage medium and execute it.

(Design Method)

Figure 3:
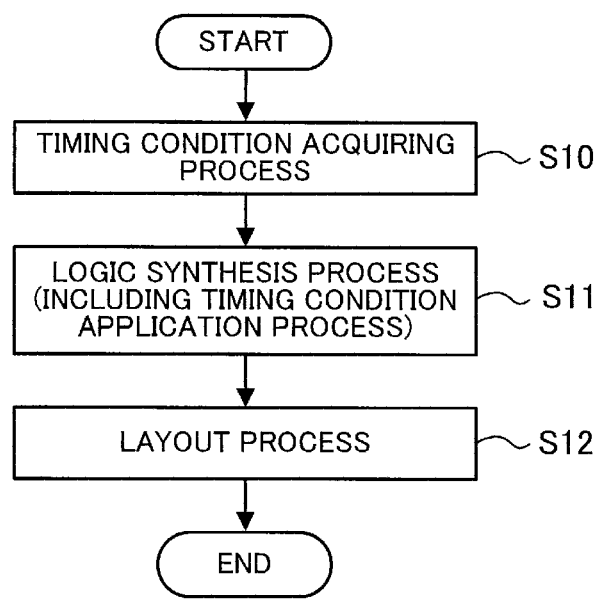
FIG. 3 illustrates a sequence of an exemplary design method of the second embodiment.

FIG. 3 illustrates a sequence of an exemplary design method of the second embodiment. The design method of the second embodiment is performed in the order of a timing condition acquiring process (step S10), a logic synthesis process (including a timing condition application process) (step S11), and a layout process (step S12). In order to perform these processes, the processor 21 reads a program (including a logic synthesis tool and other tools) stored in the HDD 23 and executes it. In the following, the process of each step will be described.

(Timing Condition Acquiring Process)

In the timing condition acquiring process of step S10, the processor 21 acquires two types of timing conditions input by a user who operates the keyboard 25a or the mouse 25b, for example. Note that the timing conditions may be stored in the HDD 23 in advance, to allow the processor 21 to retrieve the timing conditions stored in the HDD 23.

The two types of timing conditions are as described in the following, for example. FIG. 4 illustrates an example of timing conditions. FIG. 4 illustrates an example of the delay variation values at the time of automatic layout and the delay variation values at the time of manual layout, with respect to each delay variation element. The delay variation elements are a clock skew, a crosstalk delay, a clock OCV, a wiring delay gap (a gap between a wiring delay estimate and a real wiring delay), and a PLL jitter. The delay variation value of each delay variation element is decided on the basis of design specification.

Unlike automatic layout, manual layout allows a user to reduce the delay variation values due to a clock skew, a crosstalk delay, and a clock OCV. For example, the delay variation value by clock skew (skew amount) is reduced by adjusting clock lines, and the delay variation value by crosstalk delay is reduced by adding shield lines or the like.

Also, the delay variation value by the clock OCV is reduced by optimizing diverging points of the clock lines manually.

In the following, the processor 21 sets the value obtained by summing the delay variation values in the delay variation elements at the time of automatic layout, and the value obtained by summing the delay variation values in the delay variation elements at the time of manual layout, as timing conditions that are set for the registers at the time of the logic synthesis process. In the following, the former is referred to as "timing condition of the maximum margin", and the latter is referred to as "timing condition of the minimum margin". In the example of FIG. 4, the timing condition of the maximum margin is 950 ps, and the timing condition of the minimum margin is 400 ps.

(Logic Synthesis Process)

Figure 5:
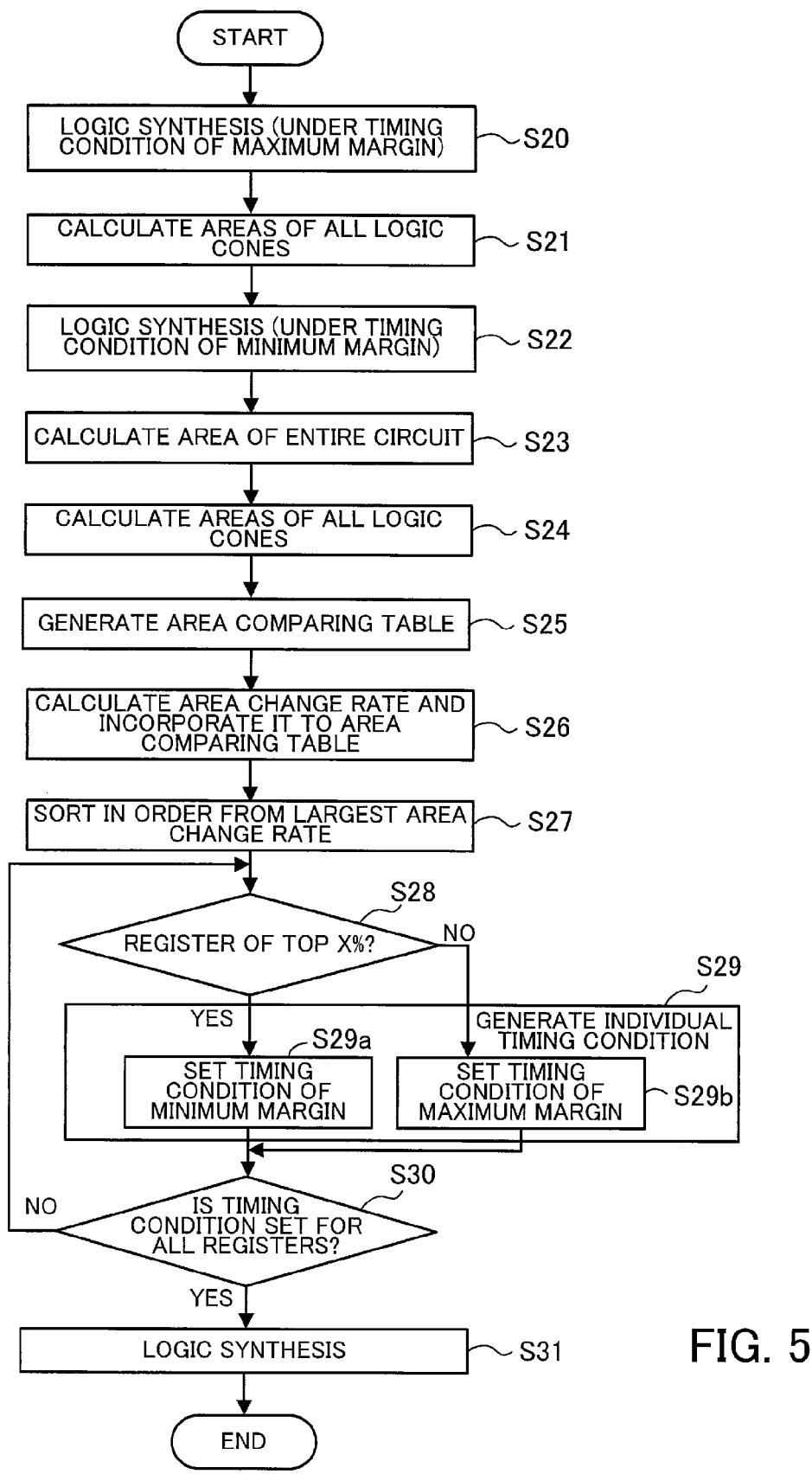
FIG. 5 is a flowchart illustrating a sequence of an exemplary logic synthesis process.

Next, the logic synthesis process including the timing condition application process of step S11 of FIG. 3 will be described. FIG. 5 is a flowchart illustrating a sequence of an exemplary logic synthesis process.

First, the processor 21 reads the RTL design information of a semiconductor integrated circuit and a library from the HDD 23, and sets the timing condition of the maximum margin for all registers, and executes logic synthesis (step S20), for example.

Figure 6:
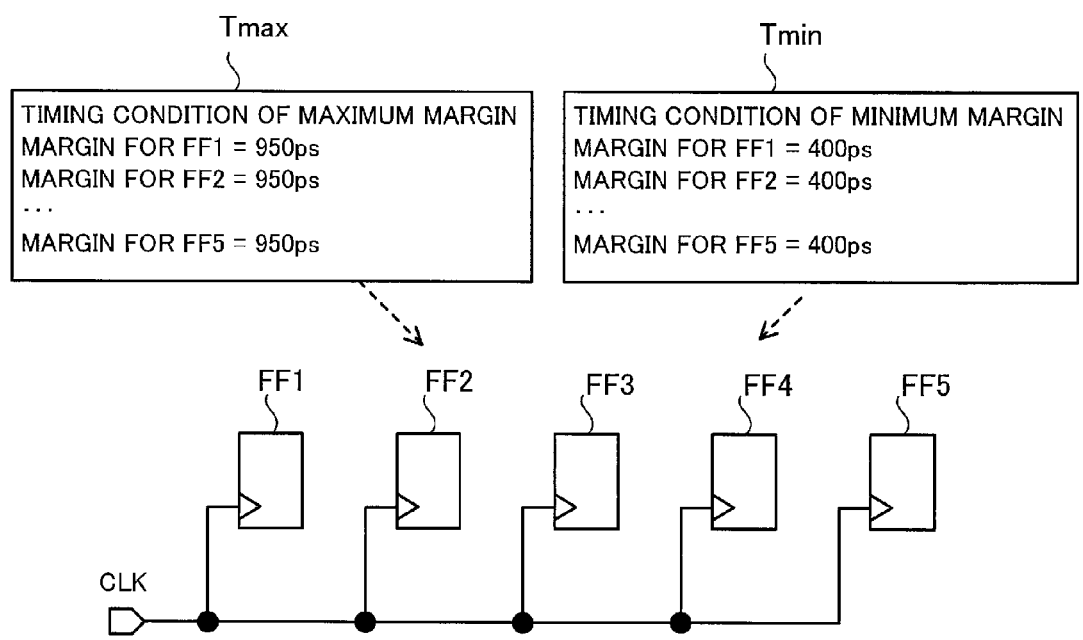
FIG. 6 illustrates exemplary setting of timing conditions.

FIG. 6 illustrates exemplary setting of the timing conditions. FIG. 6 illustrates an example in which the timing condition Tmax of the maximum margin (or the timing condition Tmin of the minimum margin) is set for all registers (flip-flops) FF1, FF2, FF3, FF4, and FF5.

In step S20, the timing condition Tmax of the maximum margin (950 ps in the example of FIG. 6) is set as the margin (timing condition) for all registers FF1 to FF5 to which the clock CLK is input. A netlist is generated in step S20.

Figure 7:
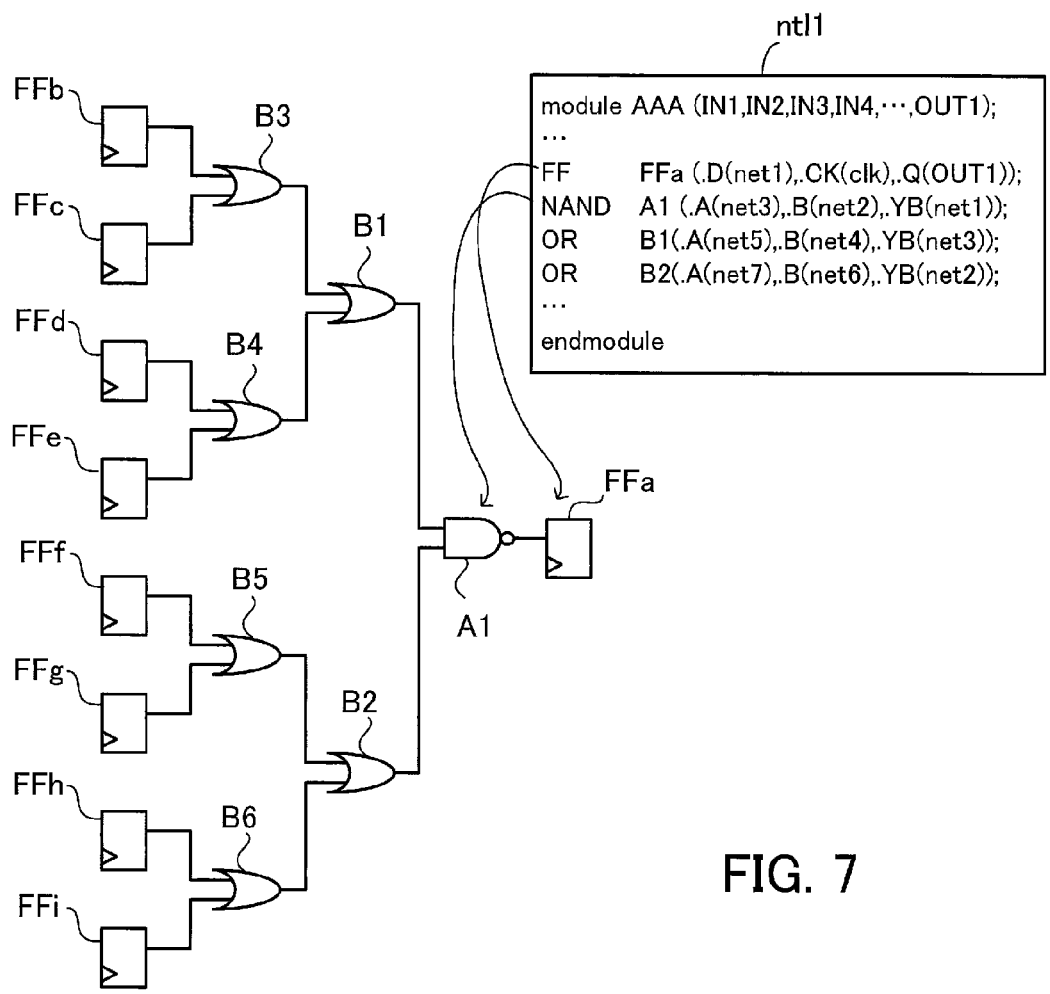
FIG. 7 illustrates an exemplary netlist and an exemplary circuit indicated by the netlist.

FIG. 7 illustrates an exemplary netlist and an exemplary circuit indicated by the netlist. The netlist ntl1 illustrated in FIG. 7 indicates connection information of each cell of a circuit having a module name "AAA". For example, a line starting from "FF" indicates connection information of a register FFa, and a line starting from "NAND" indicates connection information of a NAND circuit A1. FIG. 7 illustrates only a part of the circuit of the module name "AAA" indicated by this netlist ntl1.

The output terminal of the NAND circuit A1 is connected to the input terminal of the register FFa, and the output terminal of an OR circuit B1 is connected to one input terminal of the NAND circuit A1. The output terminal of an OR circuit B2 is connected to the other input terminal of the NAND circuit A1. The output terminal of an OR circuit B3 is connected to one input terminal of the OR circuit B1, and the output terminal of an OR circuit B4 is connected to the other input terminal of the OR circuit B1. The output terminal of an OR circuit BE is connected to one input terminal of the OR circuit B2, and the output terminal of an OR circuit B6 is connected to the other input terminal of the OR circuit B2.

The output terminal of the register FFb is connected to one input terminal of the OR circuit B3, and the output terminal of the register FFc is connected to the other input terminal of the OR circuit B3. The output terminal of the register FFd is connected to one input terminal of the OR circuit B4, and the output terminal of the register FFe is connected to the other input terminal of the OR circuit B4. The output terminal of the register FFf is connected to one input terminal of the OR circuit B5, and the output terminal of the register FFg is connected to the other input terminal of the OR circuit B5. The output terminal of the register FFh is connected to one input terminal of the OR circuit B6, and the output terminal of the register FFi is connected to the other input terminal of the OR circuit B6.

After step 520, the processor 21 calculates the areas of all logic cones on the basis of the generated netlist and the library (step S21).

Figure 8:
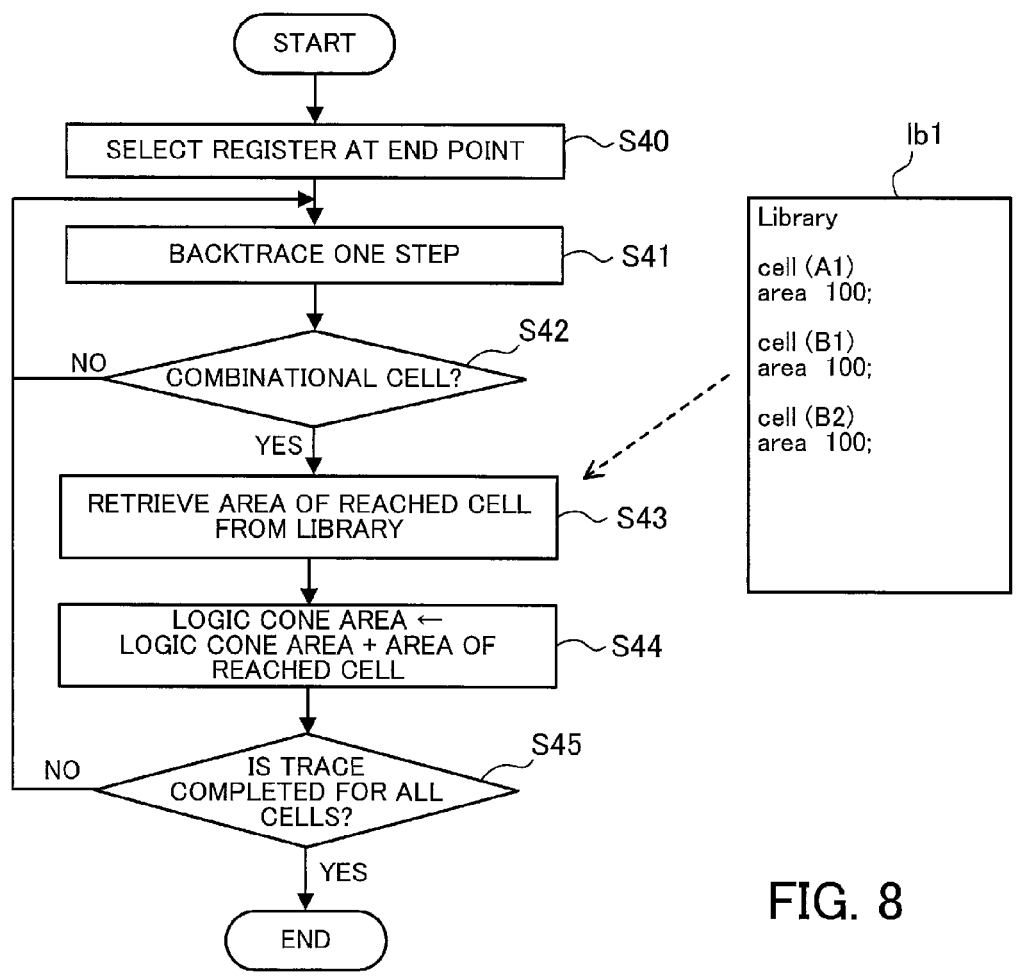
FIG. 8 is a flowchart illustrating a sequence of an exemplary process for calculating the area of a logic cone.

FIG. 8 is a flowchart illustrating a sequence of an exemplary process for calculating the area of a logic cone. The processor 21 executes the following process for each register at the end point.

First, the processor 21 selects the register at the end point of a logic cone with reference to the netlist (step S40) and backtraces one step (step S41). Then, the processor 21 determines whether or not the cell reached by the backtrace is a combinational cell (step S42), and if not a combinational cell, returns to step S41. The combinational cell is, for example, an OR circuit or an NAND circuit. For example, in the case of the circuit illustrated in FIG. 7, the register FFa is at the end point of the logic cone, and therefore the backtrace is performed from the register FFa. In the example of FIG. 7, the cell reached by backtracing one step from the register FFa is the NAND circuit A1, and therefore the processor 21 determines that the reached cell is a combinational cell.

If the reached cell is a combinational cell, the processor 21 retrieves the area of the reached cell from the library (Step S43). For example, if the reached cell is the NAND circuit A1, the processor 21 retrieves "100" as the area, in the example of the library lb1 illustrated in FIG. 8. Then, the processor 21 updates the logic cone area by adding the area of the reached cell to the logic cone area (step S44).

Thereafter, the processor 21 determines whether or not the trace is completed for all cells of the logic cone (step S45). If the trace is not completed, the processor 21 returns to step S41. If the trace is completed, the processor 21 ends the calculation of the area of the logic cone including the register at the end point which is selected in step S40.

For example, in the case of the logic cone illustrated in FIG. 7, the calculation of the area of the logic cone including the register FFa at the end point is completed when all output terminals FFb to FFi are reached by trace. The processor 21 stores the calculation result of the logic cone area in the RAM 22, for example.

The above process is executed for all registers that are at the end points of logic cones in the netlist obtained by the logic synthesis using the timing condition of the maximum margin, in order to calculate the areas of all logic cones.

Thereafter, step S22 of FIG. 5 is performed. In step S22, the processor 21 reads the library and the RTL design information of the semiconductor integrated circuit stored in the HDD 23, and sets the timing condition of the minimum margin for all registers, and executes logic synthesis, for example. In step S22, the timing condition Tmin of the minimum margin (400 ps in the example of FIG. 6) is set as the margin for all registers FF1 to FF5, in the case of the example illustrated in FIG. 6, for example. Step S22 generates a netlist that is different from the netlist generated in step S20.

After step S22, the processor 21 calculates the area of the entire generated circuit and the areas of all logic cones on the basis of the library and the netlist generated in step S22 (steps S23 and S24). In step S23, the processor 21 calculates the area of the entire circuit, by retrieving the areas of all cells that are included in the netlist from the library and summing the retrieved areas. Step 24 is executed in the same way as illustrated in FIG. 8.

Note that step S23 may be executed on the basis of the netlist generated in step S20. Also, the order of steps S20 to S24 is not limited to the above order, but steps S20 and S21 may be executed after steps S22 to S24, for example.

Thereafter, the processor 21 generates, on the basis of the processing result of steps S21 and S24 (step S25), an area comparing table for comparing areas of each logic cone including a register at its end point, generated under different timing conditions.

FIG. 9 illustrates an example of the area comparing table. The area comparing table 30 of FIG. 9 illustrates an example of the logic cone areas under the timing conditions Tmax and Tmin when the registers are at end points.

For example, as for a logic cone including the register with register name "FF_incr0p[28]" at the end point, the logic cone area is 116 under the timing condition Tmin, and is 129 under the timing condition Tmax. Also, as for a logic cone including the register with register name "FF_incr6p[8]" at the end point, the logic cone area is 131935 under the timing condition Tmin, and is 141004 under the timing condition Tmax. The processor 21 may transiently store the generated area comparing table 30 in the HDD 23, for example.

Thereafter, the processor 21 calculates an area change rate due to the difference between the timing conditions on the basis of the area comparing table, and incorporates the calculated area change rate to the area comparing table (step S26). The area change rate is calculated by subtracting the logic cone area under the timing condition Tmin from the logic cone area under the timing condition Tmax and dividing the value obtained by the subtraction by the area of the entire circuit obtained in step S23.

FIG. 10 illustrates an example of the area comparing table to which the area change rates are incorporated. The area comparing table 30a of FIG. 10 is made by incorporating the area change rates of the logic cone areas including the respective registers at end points under timing conditions Tmax and Tmin, to the area comparing table 30 illustrated in FIG. 9.

For example, as for the logic cone including the register with register name "FF_incr0p[28]" at the end point, the area change rate due to the difference between the timing conditions is 0.01%. In contrast, as for the logic cone including the register with register name "FF_incr6p[8]" at the end point, the area change rate due to the difference between the timing conditions is comparatively large at 6.00%.

A large area change rate means that there is a significant difference between a logic cone area under the timing condition Tmin and a logic cone area under the timing condition Tmax. Also, a small area change rate means that there is little difference between a logic cone area under the timing condition Tmin and a logic cone area under the timing condition Tmax.

Figure 11:
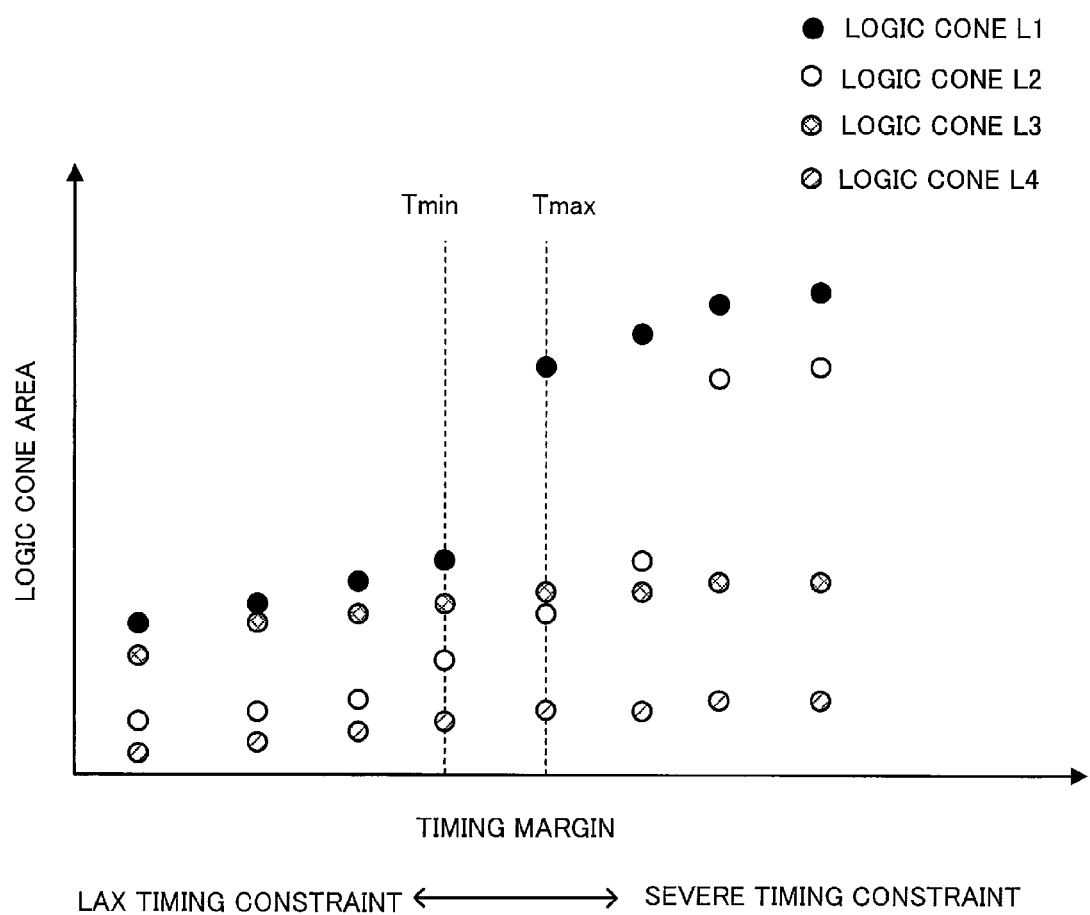
FIG. 11 illustrates exemplary changes of logic cone areas due to differences between timing conditions.

FIG. 11 illustrates exemplary changes of logic cone areas due to differences between timing conditions. The horizontal axis represents timing margin, and the vertical axis represents logic cone area. As the timing margin becomes larger, the timing constraint becomes severer, and as the timing margin becomes smaller, the timing constraint becomes laxer.

FIG. 11 illustrates how the timing margin affects the area of each logic cones L1, L2, L3, L4 generated by logic synthesis. With respect to the logic cones L3 and L4, even when the timing margin changes, the area does not change largely. In contrast, with respect to the logic cones L1 and L2, when the timing margin changes, the area changes largely. With respect to the logic cone L1 in particular, the area changes largely between the timing conditions Tmin and Tmax.

As described above, the logic cone area changes largely, because a circuit having a large area and operating at a high speed is generated to satisfy the timing condition Tmax, in the logic synthesis under the timing condition Tmax. In the logic synthesis, satisfaction of the timing condition tends to be prioritized over the area of the generated circuit.

Thus, different circuits, even though having the same function, are designed depending on timing conditions set for registers, in some cases. For example, when configuring an adder circuit, its algorithm is changed by setting different timing conditions, for example, in such a manner to design either one of a ripple-carry adder circuit that operates at a low calculation speed but has a small area and a carry-lookahead adder circuit that has a large area but operates at a high calculation speed. Also, instead of using a selector with a transfer gate, a plurality of logical elements can be combined to provide a selector function so as to make its speed higher, even though its area becomes larger, in some cases.

Area change rates are calculated in step S26 in order to determine which registers correspond to logic cones in which the above algorithm change occurs to increase the areas due to the difference between the timing conditions. Note that the processor 21 may transiently store the area comparing table 30a to which the area change rates are incorporated, in the HDD 23, for example.

Thereafter, in the area comparing table, the processor 21 sorts the register names of the registers at the end points in the order from the largest area change rate of logic cone (step S27). FIG. 12 illustrates an example of the area comparing table after sort. The area comparing table 30b of FIG. 12 is generated by sorting the area comparing table 30a illustrated in FIG. 10. In the area comparing table 30b, the register names of the registers at the end points are sorted in the order from the largest area change rate of logic cone.

In the example of FIG. 12, the register names "FF_incr6p[10]", "FF_incr6p[9]", and "FF_incr6p[8]", each of which has an area change rate of logic cone of 6.00%, are listed at the top of the area comparing table 30b (the upper side in FIG. 12). The timing condition Tmin is set for the above registers having large area change rates of logic cones. Thereby, a circuit of a small area is selected in the logic synthesis to reduce the area of the logic cone and thereby reduce the circuit area of the semiconductor integrated circuit.

Thus, in the area comparing table 30b illustrated in FIG. 12, the processor 21 selects the registers in order from the top (the register having the largest area change rate), and determines whether or not the registers are within largest X % in the area comparing table 30b (step S28). X % is set by the processor 21 or a user on the basis of an increase of work amount due to manual layout and area overhead (area increase) generated by manual layout (e.g., addition of shield lines).

Figure 13:
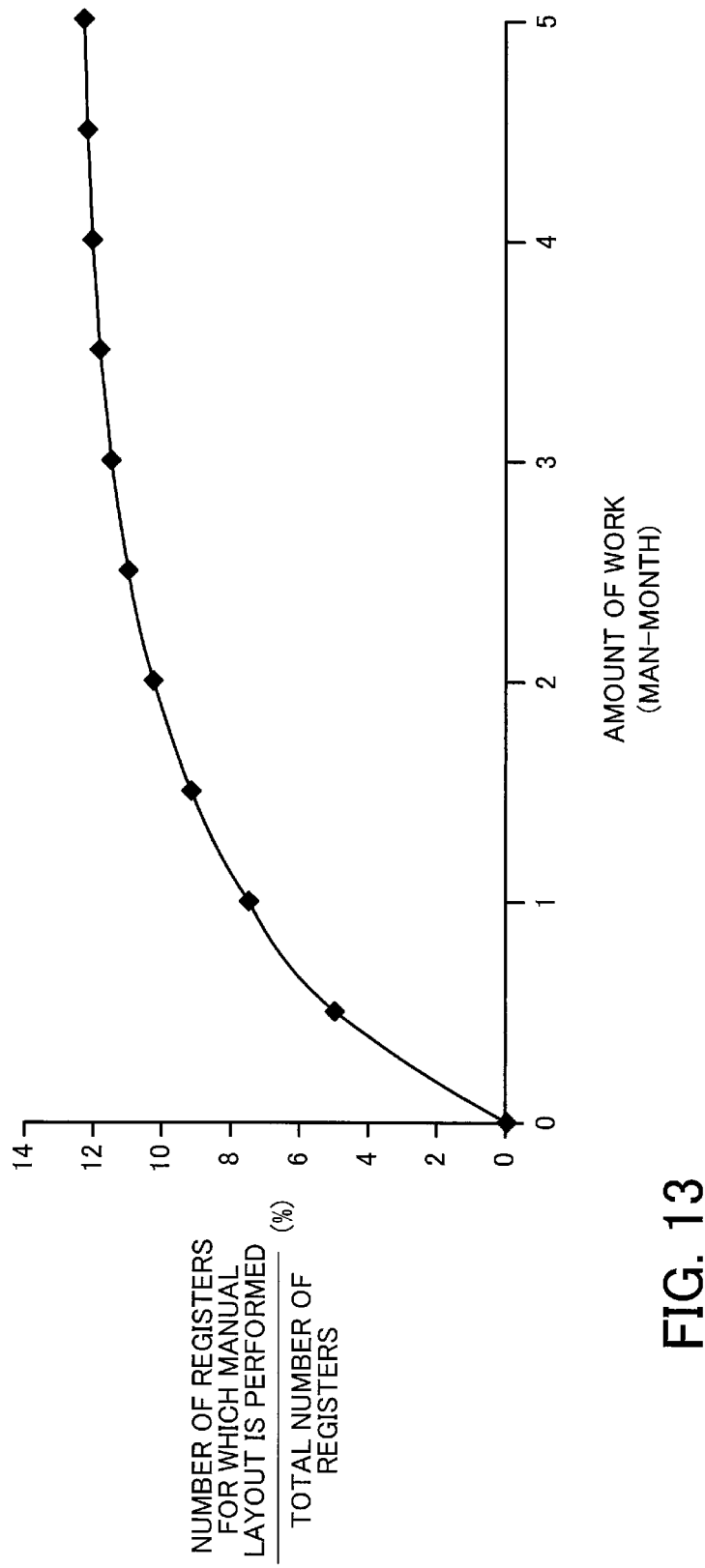
FIG. 13 illustrates an exemplary relationship between an amount of work and a proportion of registers at end points that can be designed by manual layout while reducing its area overhead.

FIG. 13 illustrates an exemplary relationship between the amount of work and the proportion of the registers at the end points that can be designed by manual layout while reducing the area overhead. This relationship is calculated by simulation on the computer 20, for example. The horizontal axis represents the amount of work (man-month), and the vertical axis represents the proportion (%) of registers at the end points that are designed by manual layout among all registers.

As illustrated in FIG. 13, the number of registers that can be designed by manual layout while reducing the area overhead (for example, while maintaining at or below a predetermined increase rate) is limited, even if the amount of work is large. In the example of FIG. 13, the number of registers that can be designed by manual layout while reducing the area overhead is approximately 12% of the total number at the maximum, even if the amount of work is large. Thus, when the relationship of FIG. 13 is obtained, it is desirable to set X to approximately 10%, considering the amount of work, for example.

After step S28, the processor 21 generates individual timing conditions (step S29). In step S29, the timing condition Tmin of minimum margin is set for each register determined to be within largest X % (step S29a), and the timing condition Tmax of maximum margin is set for each of the other registers (step S29b).

Figure 14:
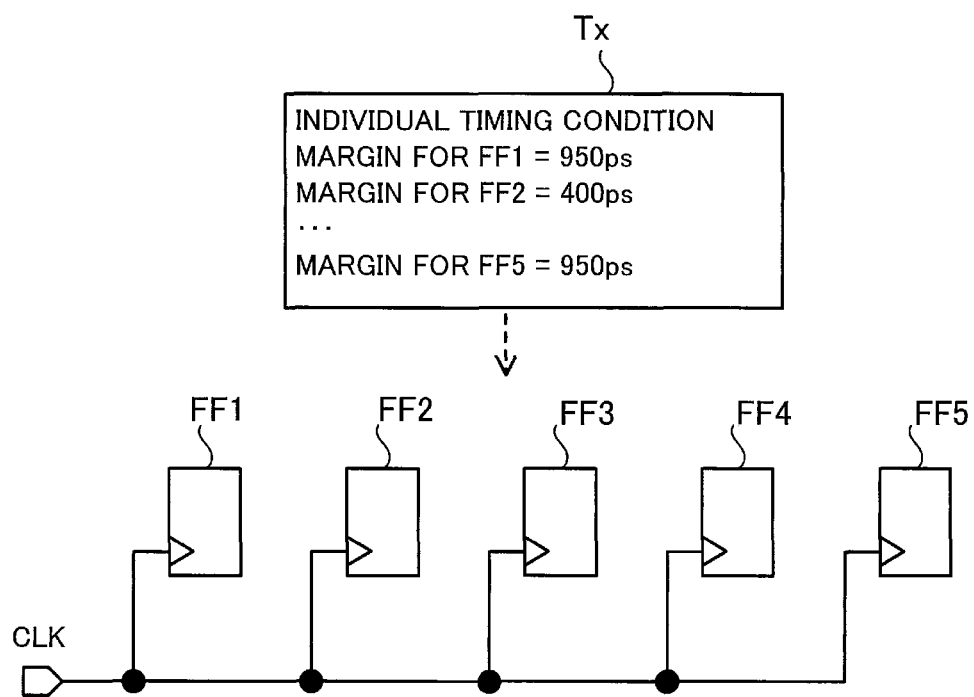
FIG. 14 illustrates individual timing conditions and their exemplary setting.

FIG. 14 illustrates individual timing conditions and their exemplary setting. In FIG. 14, the circuit to which individual timing conditions Tx are set is the same as the circuit illustrated in FIG. 6, and thus its description will be omitted. In the example of FIG. 14, the individual timing conditions Tx are created, in which the timing condition Tmax of the maximum margin is set for the registers FF1 and FF5, and the timing condition Tmin of the minimum margin is set for the register FF2, in steps S29a and S29b. Unlike the exemplary setting of the timing condition illustrated in FIG. 6, a timing condition is set individually for each of the registers FF1 to FF5.

After step S29, the processor 21 determines whether or not the timing conditions are set for all registers at end points (step S30). When there is a register for which a timing condition is not set, the process is repeated from step S28. When the timing conditions are set for all registers, the processor 21 executes logic synthesis on the basis of the individual timing conditions, the RTL design information, and the library (step S31). A new netlist is generated by the logic synthesis. The logic synthesis process ends after the above processes.

(Layout Process)

The layout process of step S12 of FIG. 3 is executed on the basis of the netlist generated in the logic synthesis process of step S31.

In this case, manual layout is performed with respect to the logic cones including the registers at the end points which are within largest X % in the list of all registers listed in the order from the largest area change rate. In order to inform a user of which registers are the registers of largest X %, the processor 21 of the computer 20 illustrated in FIG. 2 controls the graphic processing device 24 to cause the monitor 24a to display the area comparing table illustrated in FIG. 12, for example.

FIG. 15 illustrates an exemplary display of the area comparing table. FIG. 15 illustrates an example in which the area comparing table 30b is displayed on the screen 40 of the monitor 24a. In the example of FIG. 15, the register names of the top 10% listed in the order from the largest area change rate, as well as the corresponding logic cone areas and area change rates obtained when the registers having the register names are at the end point, are highlighted. Further, in the example of FIG. 15, a message stating that the highlighted part (the marked part) is a manual layout target is displayed.

The user performs manual layout on the computer 20 with respect to the logic cones corresponding to the registers with register names "FF_incr6p[10]", "FF_incr6p[9]", and "FF_incr6p[8]", with reference to the screen 40. Although all data of the area comparing table 30b is displayed on the screen 40 in the example of FIG. 15, only the register names for performing manual layout may be displayed.

In the manual layout, layout for reducing delay variations due to clock skew, crosstalk delay, and clock OCV is performed to satisfy the timing condition Tmin. In the following, an example of manual layout for reducing the delay variation due to crosstalk delay will be described.

Figure 16:
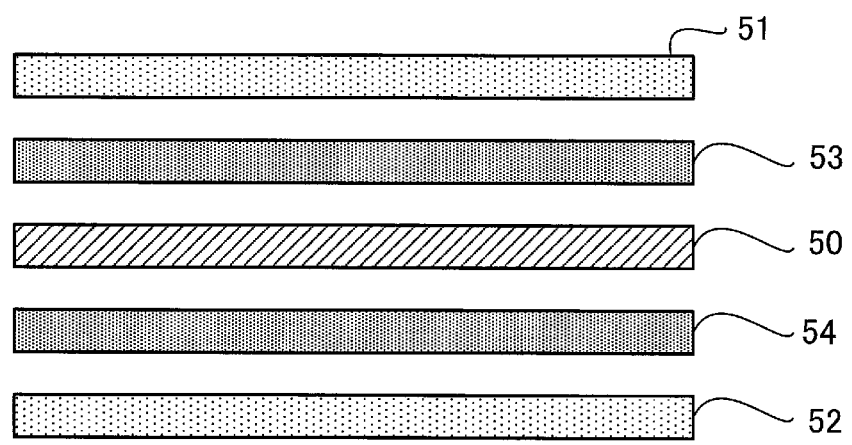
FIG. 16 illustrates an example of manual layout.

FIG. 16 illustrates an example of manual layout. For example, a line 50 is a signal line connected to a register for which the timing condition Tmin is set, and lines 51 and 52 are arbitrary signal lines. When the line 50 is close to the lines 51 and 52, the delay variation due to crosstalk delay is large. Hence, manual layout is performed to locate power supply (VSS) lines 53 and 54 as shield lines between the line 50 and the respective lines 51 and 52 as in FIG. 16, for example.

Figure 17:
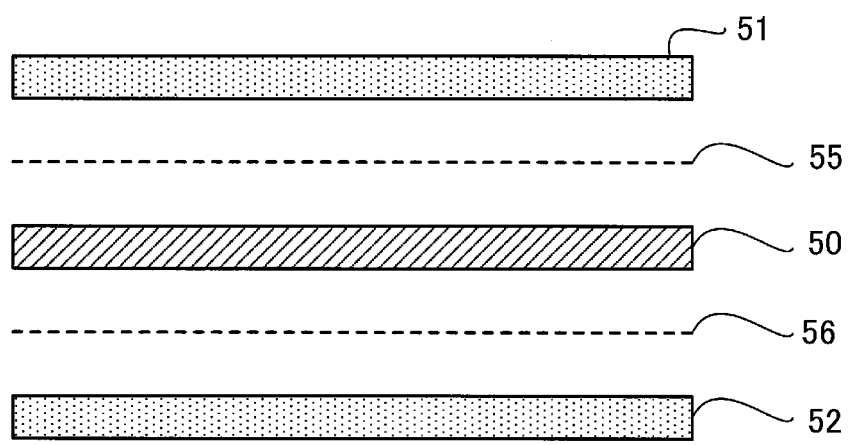
FIG. 17 illustrates another example of manual layout.

FIG. 17 illustrates another example of manual layout. In the same way as in FIG. 16, the line 50 is a signal line connected to a register for which the timing condition Tmin is set, and the lines 51 and 52 are arbitrary signal lines, for example. In the example of FIG. 17, a line is not located along the tracks 55 and 56, to place the line 50 away from the lines 51 and 52 and thereby reduce the coupling capacity between them.

With respect to the registers for which the timing condition Tmin of small timing margin is set, the delay variation values are adjusted by the above manual layout, so as to satisfy the timing condition Tmin. On the other hand, automatic layout is performed with respect to the logic cones including at the end points the registers other than the registers of largest X % of all registers listed in the order from the largest area change rate.

The design information obtained by the layout process is used to generate a mask that is used in manufacturing a semiconductor integrated circuit, for example. In the above, the example of the design method of the present embodiment has been described.

FIG. 18 illustrates an example of area reduction effect of a semiconductor integrated circuit obtained by the design method of the present embodiment. FIG. 18 illustrates areas of a semiconductor integrated circuit generated under a plurality of logic synthesis conditions, and area increase rates with reference to the area obtained when setting the timing condition Tmin for manual layout for all registers and executing logic synthesis and performing manual layout.

When setting the timing condition Tmax for automatic layout for all registers and executing logic synthesis and performing automatic layout, the area increase rate is 27%. In contrast, when setting the timing condition Tmin for the registers of the top 10% having larger area change rates and setting the timing condition Tmax for the remaining registers and executing logic synthesis and performing manual layout partially in accordance with the design method of the present embodiment, the area increase rate is 0.97%.

As described above, in the design method of the present embodiment, the processor 21 applies the timing condition Tmin of small timing margin for the registers at the end points of the logic cones having large area change rates, and executes logic synthesis. Hence, the areas of logic cones after logic synthesis are reduced efficiently, and as a result the circuit area of a semiconductor integrated circuit is reduced.

Also, the number of registers for which the timing condition Tmin is set is smaller than the number of registers for which the timing condition Tmax is set. For example, the number of registers for which the timing condition Tmin is set is limited to the top 10% having larger area change rates, so as to prevent an increase of the area and the work amount for manual layout.

According to the disclosed design method, design apparatus, and program, the circuit area of the semiconductor integrated circuit is reduced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A design method comprising:
   generating, by a processor, second design information by setting a first timing condition for a plurality of registers included in first design information of a semiconductor integrated circuit and performing first logic synthesis;
   generating, by the processor, third design information by setting a second timing condition for the plurality of registers and performing second logic synthesis, wherein the second timing condition has a smaller timing margin than the first timing condition;
   calculating, by the processor, an area change rate, due to a difference between the timing conditions, of each of a plurality of logic cones each including one of the plurality of registers at an end point, on the basis of the second design information and the third design information;
   categorizing, by the processor, the plurality of registers into a first group and a second group on the basis of magnitudes of the calculated area change rates, wherein the area change rates of the second group are smaller than the area change rates of the first group; and
   executing, by the processor, third logic synthesis with the second timing condition being set for first registers of the first group and the first timing condition being set for second registers of the second group.

2. The design method according to claim 1, wherein
   the categorizing includes categorizing, by the processor, the plurality of registers into the first group and the second group in such a manner that the number of first registers is smaller than the number of second registers.

3. The design method according to claim 1, further comprising
   executing, by the processor, a manual layout based on an input from a user with respect to first logic cones each including one of the first registers at the end point, and an automatic layout with respect to second logic cones each including one of the second registers at the end point.

4. The design method according to claim 3, wherein
   number of the first registers is set based on an increase of an amount of work and an area resulting from the manual layout.

5. A design apparatus comprising:
   a processor configured to perform a procedure including:
   generating second design information by setting a first timing condition for a plurality of registers included in first design information of a semiconductor integrated circuit and performing first logic synthesis;
   generating third design information by setting a second timing condition for the plurality of registers and performing second logic synthesis, wherein the second timing condition has a smaller timing margin than the first timing condition;
   calculating an area change rate, due to difference between the timing conditions, of each of a plurality of logic cones each including one of the plurality of registers at an end point, on the basis of the second design information and the third design information;
   categorizing the plurality of registers into a first group and a second group on the basis of magnitudes of the calculated area change rates, wherein the area change rates of the second group are smaller than the area change rates of the first group; and
   executing third logic synthesis with the second timing condition being set for first registers of the first group and the first timing condition being set for second registers of the second group.

6. A non-transitory computer-readable storage medium storing a computer program that causes a computer to perform a procedure comprising:
   generating second design information by setting a first timing condition for a plurality of registers included in first design information of a semiconductor integrated circuit and performing first logic synthesis;
   generating third design information by setting a second timing condition for the plurality of registers and performing second logic synthesis, wherein the second timing condition has a smaller timing margin than the first timing condition;
   calculating an area change rate, due to a difference between the timing conditions, of each of a plurality of logic cones each including one of the plurality of registers at an end point, on the basis of the second design information and the third design information;
   categorizing the plurality of registers into a first group and a second group on the basis of magnitudes of the calculated area change rates, wherein the area change rates of the second group are smaller than the area change rates of the first group; and
   executing third logic synthesis with the second timing condition being set for first registers of the first group and the first timing condition being set for second registers of the second group.

* * * * *